(12) United States Patent
Eum et al.

(10) Patent No.: US 6,181,447 B1
(45) Date of Patent: Jan. 30, 2001

(54) LASER SCANNING UNIT

(75) Inventors: Jae-yong Eum, Suwon; Hwan-young Choi, Anyang; Sung-min Cho, Seoul; Moon-gyu Lee, Suwon; Jee-hong Min; Young-il Kim, both of Yongin, all of (KR)

(73) Assignee: Samsung Electronics Co., Ltd., Kyungki-Do (KR)

( * ) Notice: Under 35 U.S.C. 154(b), the term of this patent shall be extended for 0 days.

(21) Appl. No.: 09/422,349

(22) Filed: Oct. 21, 1999

(30) Foreign Application Priority Data

Oct. 23, 1998 (KR) .................................................. 98-44570

(51) Int. Cl.[7] ....................................................... G02B 5/32
(52) U.S. Cl. .............................. 359/18; 359/17; 359/209; 347/243
(58) Field of Search ................................. 359/17, 18, 204, 359/209; 235/457; 347/241, 243

(56) References Cited

FOREIGN PATENT DOCUMENTS 60-68313 * 4/1985 (JP) ........................................ 359/18

* cited by examiner

*Primary Examiner*—Darren Schuberg
(74) *Attorney, Agent, or Firm*—Sughrue, Mion, Zinn, Macpeak & Seas, PLLC

(57) ABSTRACT

A laser scanning unit (LSU) in a structure capable of radiating heat generated by a light source. The LSU includes at least one light source, a driving source for providing rotational force, and a deflection disk installed on a rotary shaft of the driving source, for diffracting and deflecting light incident from the light sources. The deflection disk has at least one radiating portion which is depressed in and/or protrudes from the surface of the deflection disk facing the light source and induces air flow by contact with air, such that the heat generated by the light sources is radiated by the air flow induced due to the radiating portion.

5 Claims, 5 Drawing Sheets

LASER SCANNING UNIT

BACKGROUND OF THE INVENTION

1. Field of the Invention

The present invention relates to a laser scanning unit (LSU) adopting a deflection disk, and more particularly, to a LSU adopting a deflection disk having a structure capable of radiating heat generated by a light source.

2. Description of the Related Art

In general, a LSU is a device which scans laser beams onto a photoreceptor so as to form a latent electrostatic image used for development. The LSU is widely used in an image output device which outputs an image by electrophotography and is divided into a rotary polygon mirror type and a deflection disk type according to the type of deflector adopted in the LSU.

Referring to FIG. 1, a conventional deflection disk type LSU includes a driving source 10 for providing a rotational force, a deflection disk 15 installed on a rotary shaft 11 of the driving source 10 and light sources 20 which are installed facing one surface of the deflection disk 15 at a predetermined angle and irradiate laser beams.

The deflection disk 15 consists of a plurality of sectors 15a each having a hologram pattern. The deflection disk generates as many scan lines as the number of sectors by being rotated once by the driving source 10.

The light irradiated by the light sources 20 is transmitted to the deflection disk 15 and is simultaneously deflected thereby to form scan lines. A semiconductor laser emitting laser beams of a predetermined wavelength is used for the light sources 20. Specifically, the laser irradiates light of various wavelengths depending on the change in the environment such as an increase in temperature. Accordingly, the directions of diffraction and deflection of the light change after passing through the deflection disk 15, so that the scan lines head in undesirable directions.

SUMMARY OF THE INVENTION

To solve the above problem, it is an object of the present invention to provide a laser scanning unit (LSU) adopting a deflection disk having a structure which is capable of emitting heat generated by a light source.

To achieve the above object, there is provided a laser scanning unit (LSU) comprising at least one light source, a driving source for providing rotational force, and a deflection disk installed around a rotary shaft of the driving source, for diffracting and deflecting light incident from the light sources, wherein the deflection disk has at least one radiating portion which is depressed in and/or protrudes from the surface of the deflection disk facing the light source and induces air flow by contact with air, such that the heat generated by the light sources is radiated by the air flow induced due to the radiating portion.

BRIEF DESCRIPTION OF THE DRAWINGS

The above object and advantages of the present invention will become more apparent by describing in detail preferred embodiments thereof with reference to the attached drawings in which.

DESCRIPTION OF THE PREFERRED EMBODIMENTS

Figure 1:
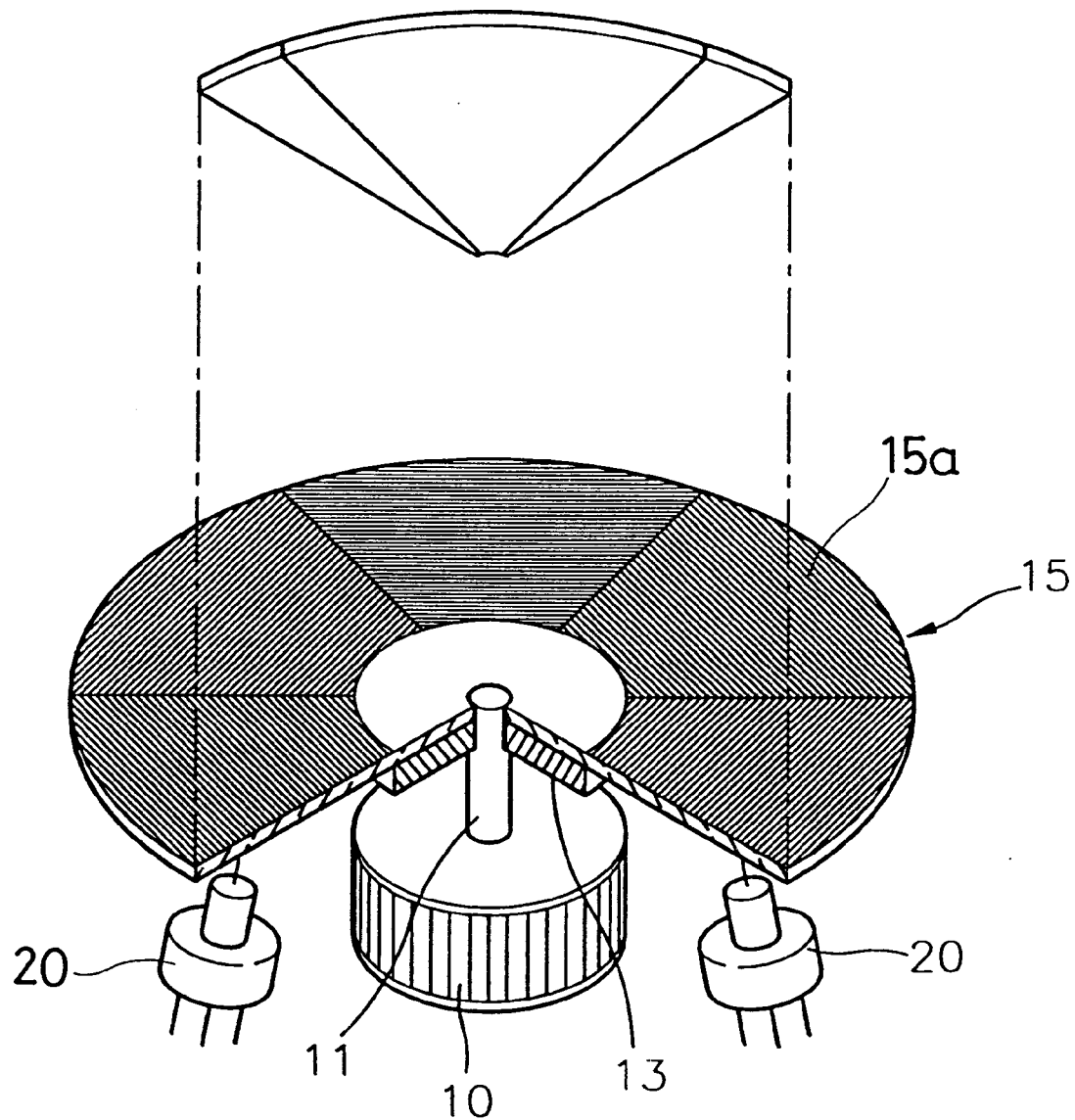
FIG. 1 is an exploded perspective view of a conventional laser scanning unit (LSU)
Figure 2:
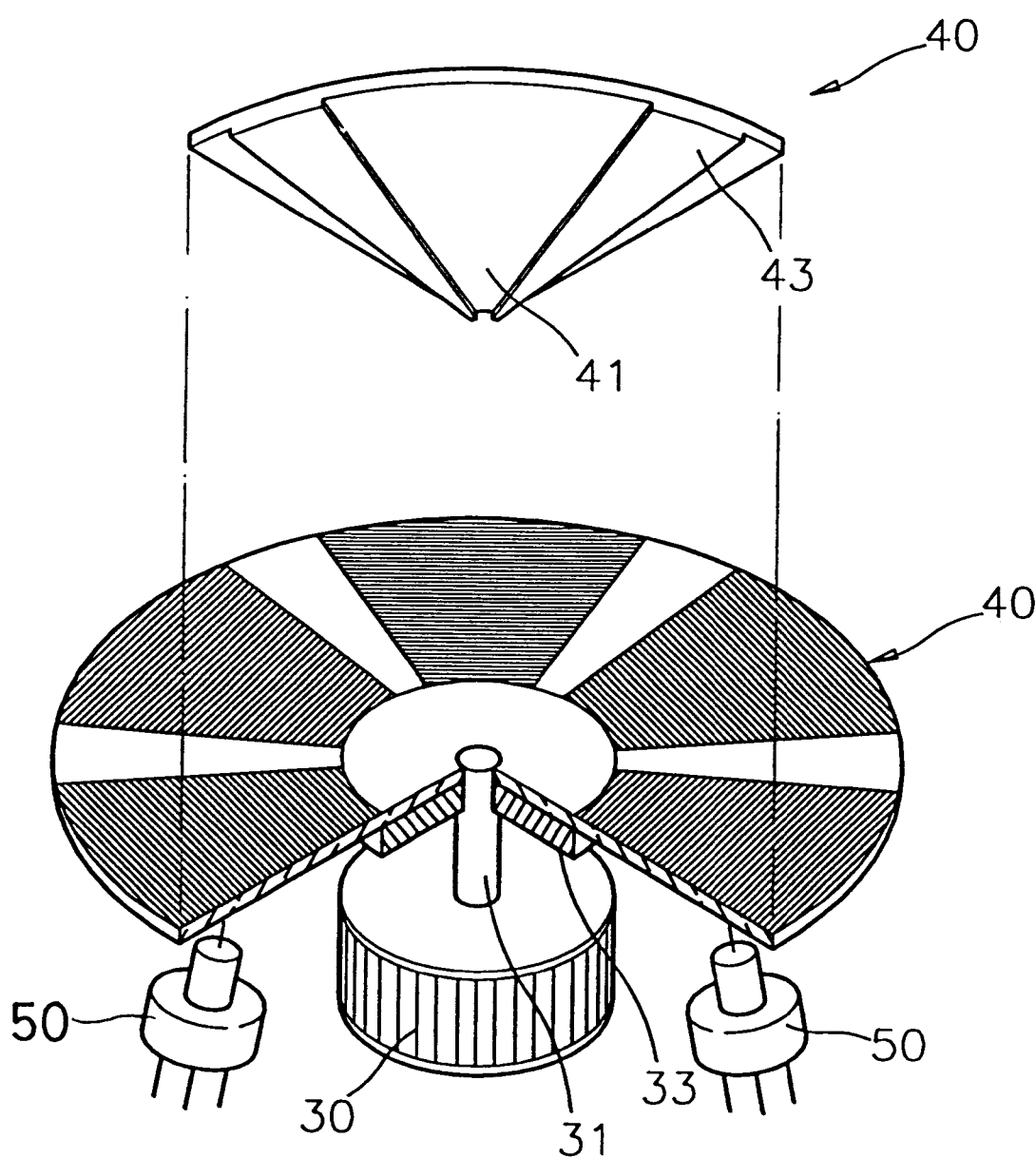
FIG. 2 is an exploded perspective view of a LSU according to a preferred embodiment of the present invention.
Figure 3:
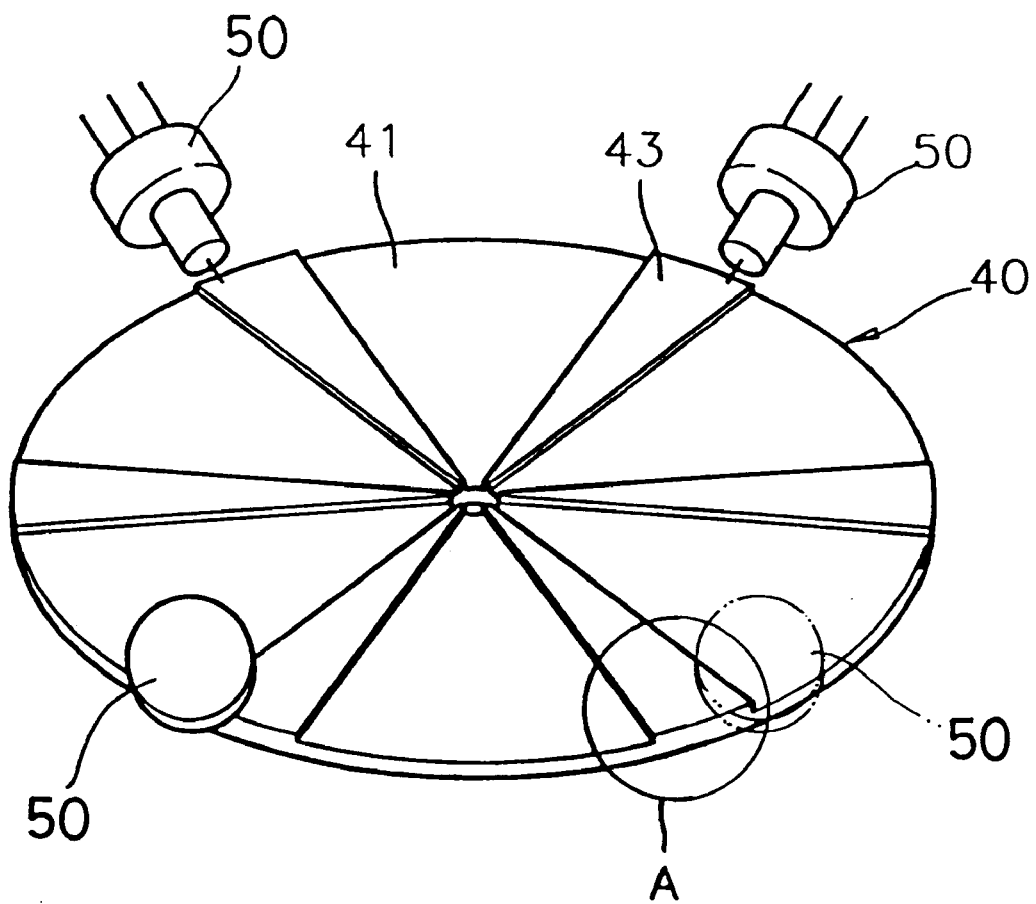
FIG. 3 is a perspective view of the light sources and the deflection disk of FIG. 2.

Referring to FIGS. 2 and 3, a laser scanning unit (LSU) according to a preferred embodiment of the present invention includes at least one light source 50, a driving source 30 for providing a rotational force and a deflection disk 40 having a radiating portion 43 for emitting heat generated by the light source 10.

The light source 50 is arranged facing the bottom of the deflection disk 40 at a predetermined angle and irradiates laser beam of a predetermined wavelength. The number of light sources is determined according to the number of scan lines which are to be generated simultaneously. FIG. 3 shows an example of using four light sources 50 to form four scan lines simultaneously.

The deflection disk 40 rotates on a rotary shaft 31 of the driving source 30 and simultaneously diffracts and deflects the light incident from the light sources 50 to scan. As shown in FIG. 2, the LSU may further comprise a turntable 33 capable of receiving the deflection disk 40 installed around the rotary shaft 31.

The deflection disk 40 consists of a plurality of sectors 41 each having a hologram pattern and generates as many scan lines as the number of sectors for each light source 50 by being rotated once by the driving source 30.

Figure 4:
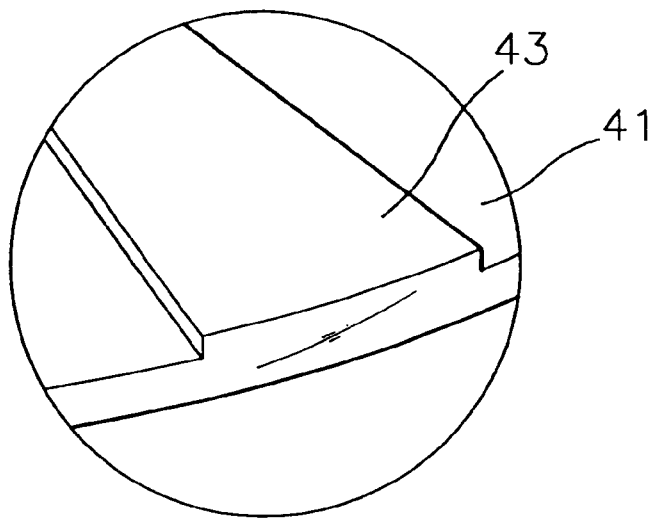
FIG. 4 is a magnified view of the portion A of FIG. 3.

Referring to FIGS. 2 through 4, the disk includes radiating portions 43 that protrude from a top surface of the deflection disk 40 that faces the light sources 50. The radiating portions generate air flow due to the presence of the stepped portions. Accordingly, the heat generated by the light sources 50 is radiated (i.e., removed) by the air flow generated by the radiating portions 43, thereby suppressing an increase in temperature of the light sources 50. Of course, the radiating portions 43 may be formed in a depression in the bottom surface of the deflection disk 40.

Preferably, a radiating portion 43 is formed between each sector having a hologram pattern, so that it does not affect the deflection. However, a single radiating portion may be provided.

Figure 5:
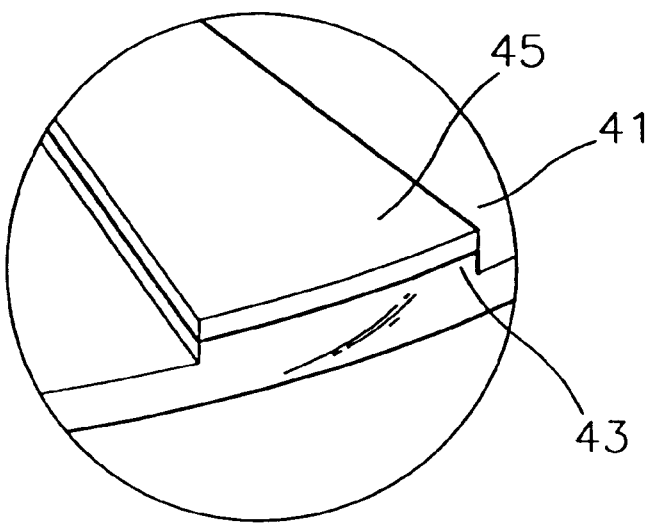
FIG. 5 is a magnified view of the portion A of FIG. 3 in the case where a blocking member is provided.

Also, preferably, a blocking member 45 for blocking the light incident from the light sources 50 may be formed on the surface of the radiating portions 43 facing the light sources 50 as shown in FIG. 5. The blocking member 45 is formed by coating an opaque material or a reflective material on the radiating portions 43, so that it absorbs or reflects the incident light.

Figure 6:
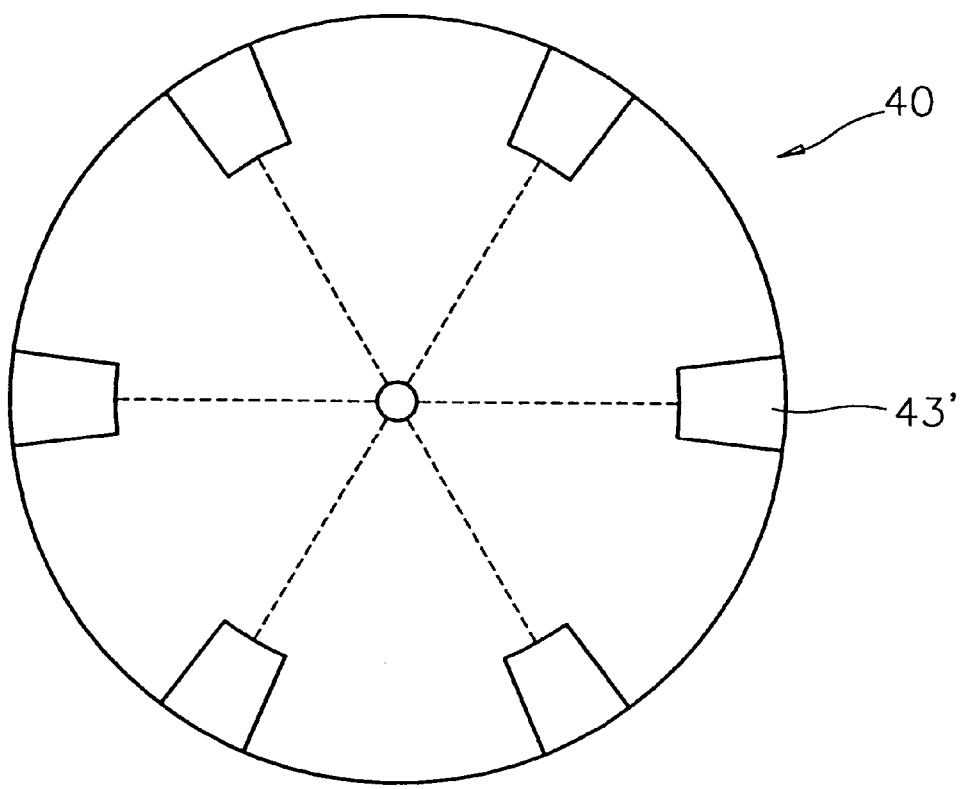
FIG. 6 is a plan view of a deflection disk according to another embodiment of the present invention.
Figure 7:
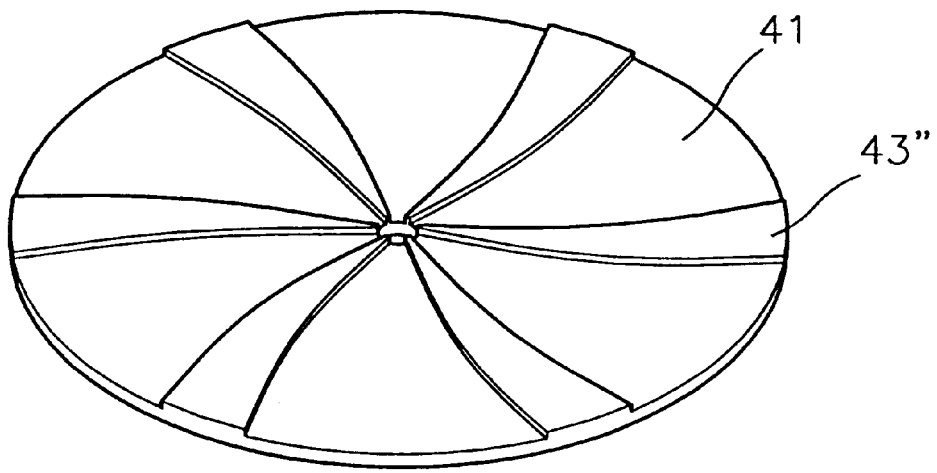
FIG. 7 is a perspective view of a deflection disk according to still another embodiment of the present invention.

As shown in FIGS. 2 and 3, the radiating portions 43 according to a first embodiment of the present invention may be in the form of an arc, the width of which increases toward the outer circumference of the deflection disk 40. Alternatively, radiating portion 43', according to a second embodiment of the present invention may be partially formed at the bottom of the deflection disk around the outer circumference of the deflection disk 40 as shown in FIG. 6. In this case, the intervals between each sector having a hologram pattern may become narrow. As shown in FIG. 7, radiating portions 43", according to a third embodiment of the present invention, may have a spiral structure which increases the contact area with the air during rotation of the deflection disk. That is, assuming that the number of rotations per minute of the deflection disk 40 are equal, the radiating portions 43" of FIG. 7 exhibit a high radiation effect for the light sources 50 as opposed to the radiating portions 43 of FIG. 3, due to their large contact area with air.

As described above, the LSU according to the present invention can induce the air flow during rotation of the deflection disk using the radiating portions formed on the surface of the deflection disk facing the light sources, thereby suppressing an increase in temperature of the light sources. As a result, a change in wavelength due to the increase in temperature can be reduced. In addition, deviation of the scan lines from a desired scanning direction due to increase in temperature can be decreased.

What is claimed is:

1. A laser scanning unit (LSU) comprising:
    at least one light source;
    a driving source for providing rotational force; and
    a deflection disk installed on a rotary shaft of said driving source, for diffracting and deflecting light incident from said light sources,
    wherein said deflection disk has at least one radiating portion provided on a surface of said deflection disk facing said light source, said radiating portion being at a different height from an adjacent portion of said disk so as to define a step therebetween, said step inducing air flow such that heat generated by said light source is radiated by the air flow.

2. The laser scanning unit of claim 1, wherein said deflection disk has a plurality of sectors each with a hologram pattern, and said radiating portion is formed between each of said sectors.

3. The laser scanning unit of claim 1, wherein said deflection disk further comprises a blocking member formed in said surface of said radiating portion facing said light source, for blocking the light incident from said light source.

4. The laser scanning unit of claim 1, wherein said radiation portion protrudes toward said light source.

5. The laser scanning unit of claim 1, wherein said radiation portion is recessed in said surface facing said light source.

* * * * *